Patented Apr. 1, 1947

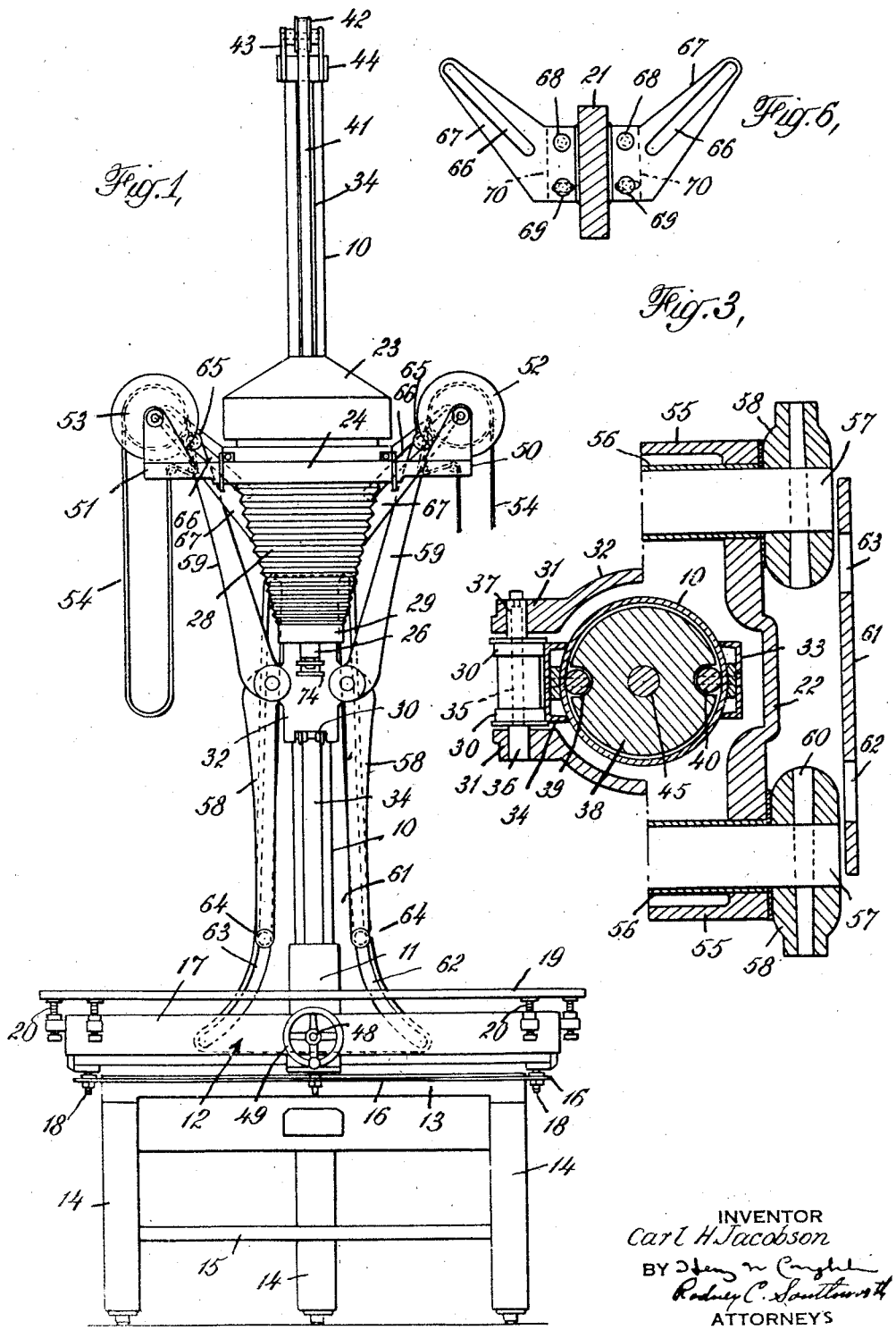

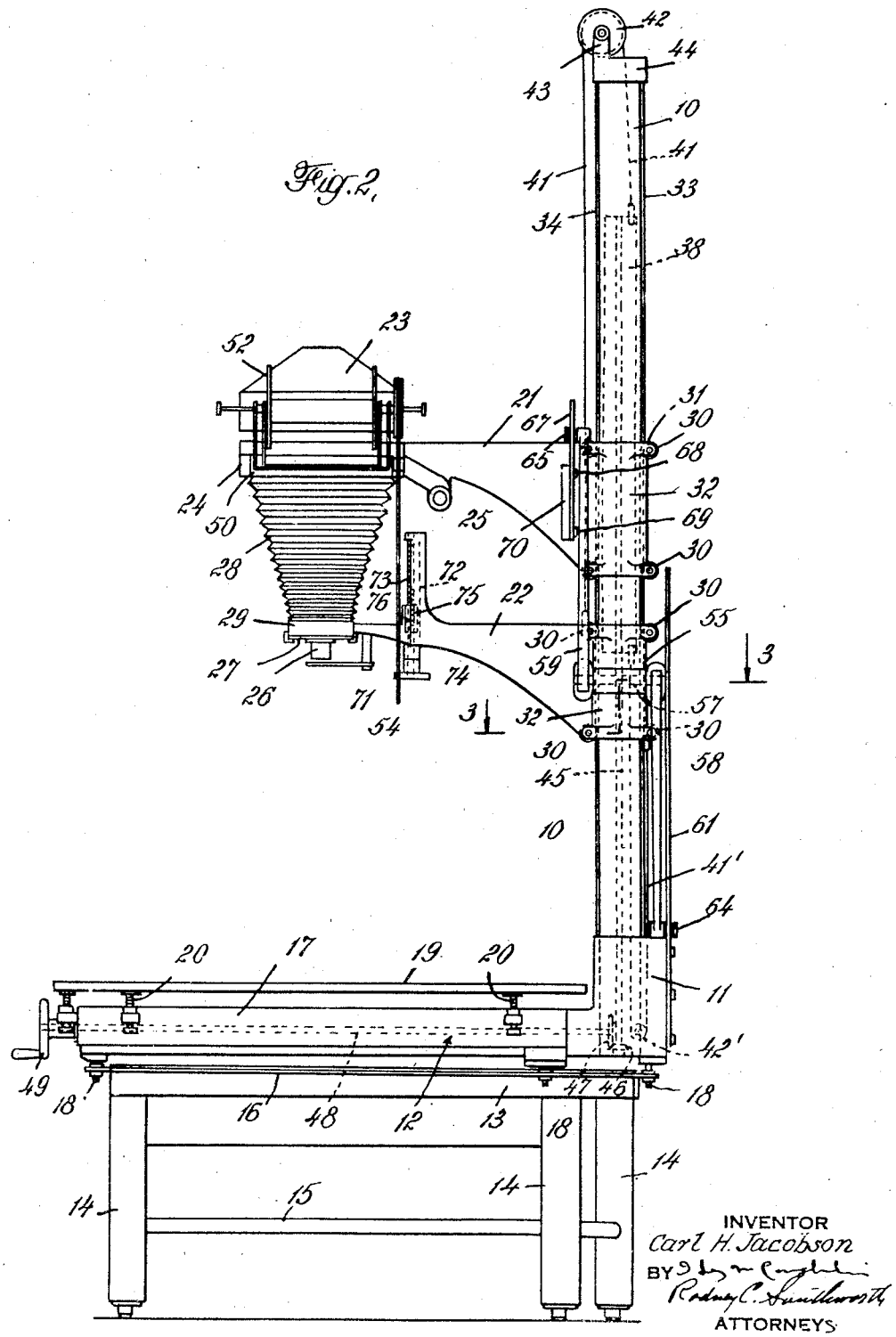

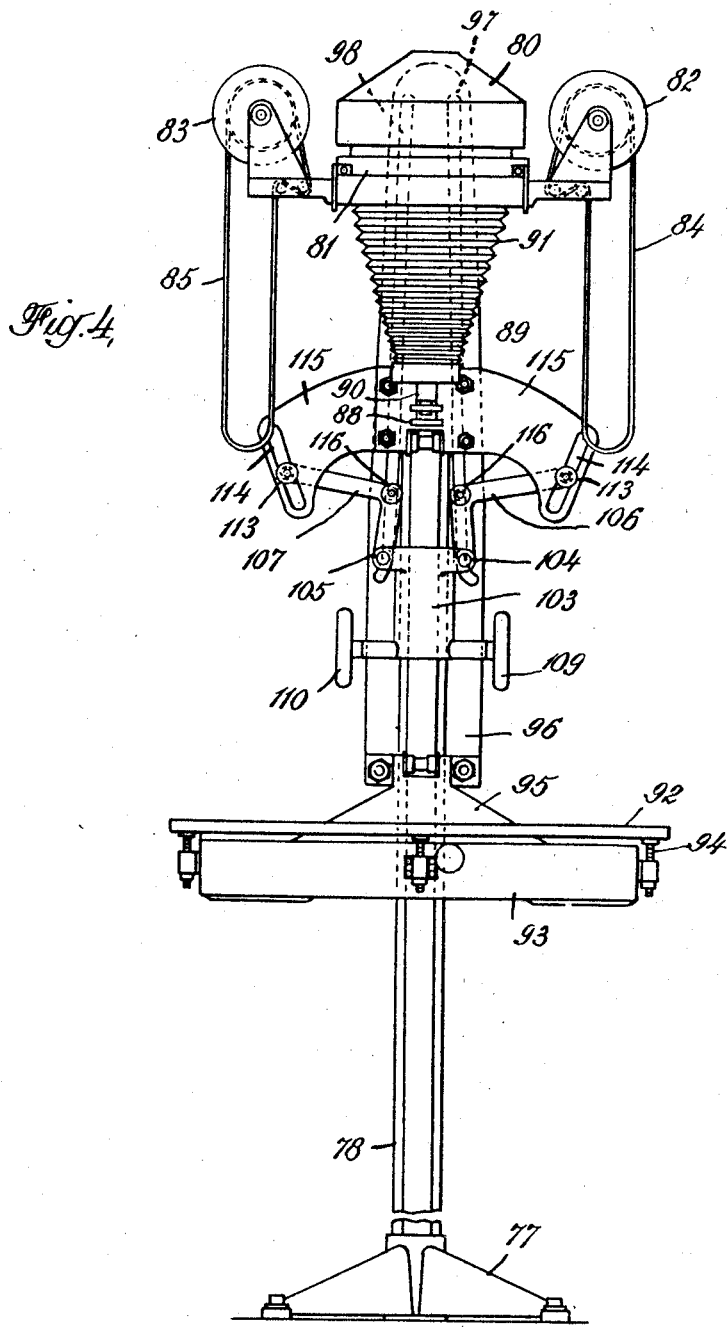

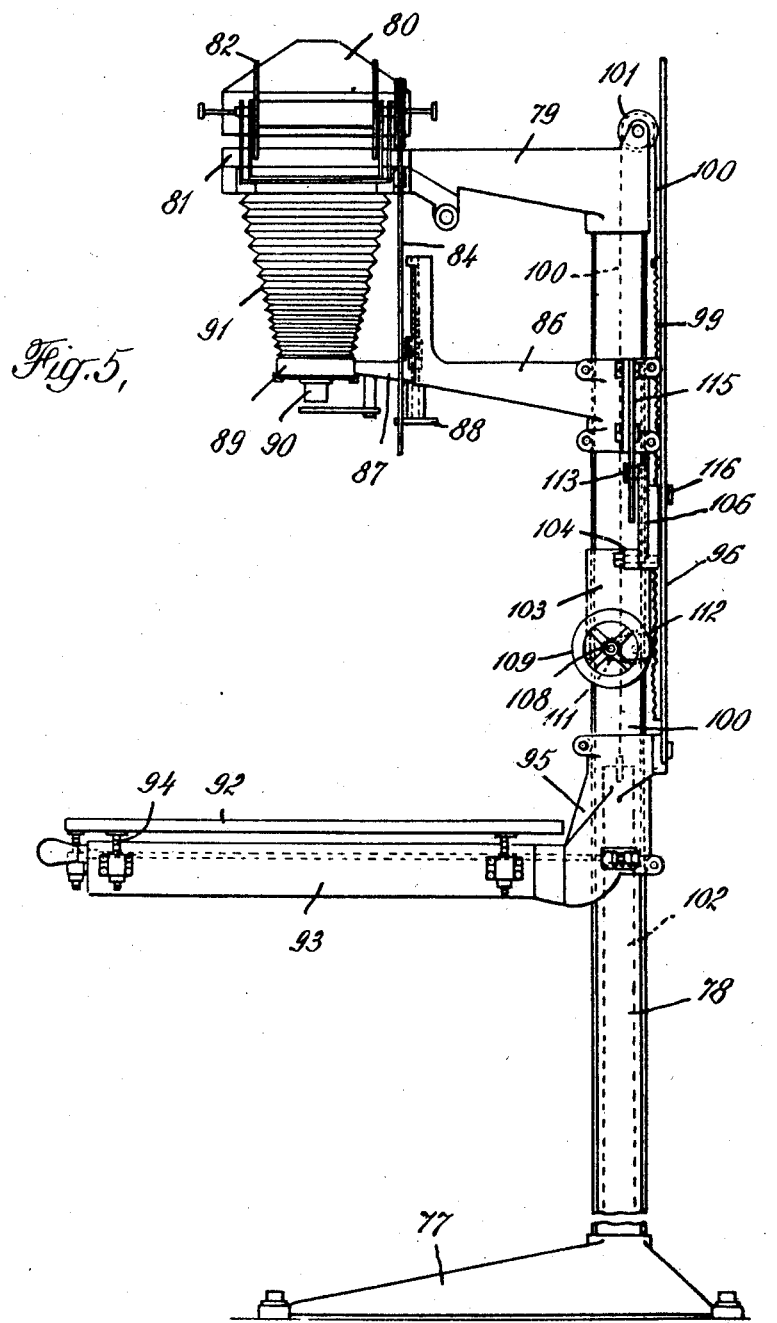

2,418,230

UNITED STATES PATENT OFFICE 2,418,230

AUTOMATICALLY FOCUSSED PROJECTION PRINTER

Carl H. Jacobson, Binghamton, N. Y., assignor to General Aniline & Film Corporation, New York, N. Y., a corporation of Delaware Application April 13, 1944, Serial No. 530,833

10 Claims. (Cl. 88—24)

This application relates to automatic focusing mechanism such as is employed in photographic enlargers or projection type printers. The invention is more specifically concerned with that part of such printers as pertains to the automatic focusing of the printer lens as the scale of enlargement is varied. According to constructions used heretofore, the focusing of the lens has been automatically accomplished by cam means, but such cams have been so constructed that their active surface from which the focusing movements have been derived has functioned at unusually steep angles.

Among other distinctive features, the invention herein described and claimed provides for focusing the lens as the scale of enlargement is changed and that focusing movement is divided between a plurality of cams which function simultaneously. Accordingly, a printer has been developed which employs cams no one of which is ever forced to act at an angle anywhere near so steep as those heretofore employed. By dividing the movement between a plurality of cams which function simultaneously to vary the position of the lens, a precise focusing movement is easily obtained. It is not necessary to calculate or to grind the cams as accurately as would be necessary for a single cam, yet more critical focusing will be forthcoming, especially at that end of the cam which causes the most rapid change of focus per unit of movement between the lens and the projection board.

In practice, the cam paths may be very close to straight lines. According to a preferred form of the mechanism, one cam pathway is formed as a straight line while the other or complementary pathway is of the usual functional curvature, but it is not necessary to carry the pathway into the steepest part of the curve; the cam path is limited to the straightest portion of the curve.

The invention is applicable to all types of projection printers or enlargers, but it is especially adapted to use in very large units since its action is balanced and movement of the parts does not require more than a minimum of effort to overcome inertia and a slight amount of friction. No springs are necessary and the movable elements are counterbalanced, although that may be dispensed with in smaller units.

The invention is herein described by reference to preferred forms of the same, two such forms being illustrated. It should be understood that these are merely representative and that the invention is in no way limited thereto. In one of these the automatic mechanism has been applied to a projection printer in which the lamp and negative carrier are relatively fixed in position while the projection board is movable for varying the scale of enlargement and wherein, along with movements of that board, the lens assumes different positions to vary its focus accordingly. In the other form illustrated, the lens carrier, also the positions of the lamp and the negative holder, are movable relatively to each other and with respect to the projection board. It will be readily recognized that one of these is the full equivalent of the other and that the application of the focusing mechanism in each instance varies in only those respects necessary to apply it to a specific problem.

The invention will hereinafter be described in greater detail by referring to the accompanying figures of drawing in which:

Fig. 1 is a front elevation of a printer to which the invention has been applied.

Fig. 2 is a side elevation of the printer shown in Fig. 1.

Fig. 3 is a section taken at line 3—3, Fig. 2.

Fig. 4 is a front elevation of a printer to which a second form of the invention has been applied.

Fig. 5 is a side elevation of the printer illustrated in Fig. 4.

Fig. 6 is a detail view of certain adjustable cams.

Now referring to Figs. 1, 2 and 3, the invention has been applied to an enlarger or projection printer of that general type in which the projection board is relatively stationary while the lamp, negative carrier and lens are movable toward and away from the projection board for the usual purposes of varying the ratio or scale of enlargement. It is a well known fact that as this ratio or scale of enlargement is varied, the lens must be focused if sharply defined images are to be projected at the plane of the projection board.

In these figures only so much of the printer has been illustrated as is necessary for conveying a clear understanding of the manner in which the invention is applied, also the form it may take for accomplishing its intended purpose in a mechanism having this particular construction. The printer itself includes a tubular post 10 set in a base or bracket 11 which is rigidly attached at the back of the projection board assembly, generally indicated by numeral 12. Here the projection board assembly is rigidly connected to a table top 13 having legs 14, braces 15 and an extending metal plate 16 to which the framework 17 is adjustably bolted by a plurality of studs 18, these being used for leveling the entire structure. The projection board itself is indicated at 19 and is adjustably supported on the framework 17 by a number of adjusting studs 20, these constituting an independent adjusting or leveling means for the board. Of course, the projection board is sometimes intentionally set at an angle when it is desired to correct for distortion, or for other well known reasons.

The movable structure which, as above stated, includes the lamp, negative carrier and lens, is supported with its center line passing centrally through the projection board. These elements may be moved to and from the board upon brackets or supports 21 and 22. The bracket 21 supports the lamp structure which is contained within a lamp house 23 and a negative carrier generally indicated by numeral 24 and which is hinged at 25. The bracket 22 supports lens 26 carried in a lens board 27 of the usual construction. Of course, different lenses may be substituted. A bellows 28 extends from the lens board holder 29 up to the base of the negative carrier. It is to be understood that this portion of the printer may be varied in accordance with any of the well known practices and the invention herein described and claimed is not in any way dependent upon or limited to the type of illumination employed, the particular means for holding the negative for projection, or the lens or other objective used.

The brackets 21 and 22 are movable along the post 10 and for the purpose of rendering that movement as frictionless as possible, each of the brackets has a plurality of rollers 30, each of which is freely pivoted in projecting lugs or ears 31 which extend from the tubular or hub portion 32 of these brackets. The rollers 30 make contact with channel sectioned strips 33 and 34. They are adjustable since their pivots are held within an eccentrically adjustable mounting. These strips are rigidly attached at the back and front of post 10. The brackets make no other contact with the post and thus there is only the rolling friction of the rollers along the strips and that of the rollers on their supporting spindles.

Each of the brackets is similarly provided for movement along the post and thus a description of one is applicable to the other. The sectional view, Fig. 3, shows the post, strips, the lugs and the details of a roller and its supporting spindles as well as other details. This section is taken at line 3—3, Fig. 2, and only so much of the construction has been drawn as appears at the line at which the section itself is taken. That has been done merely for purposes of simplifying the illustration. The rollers 30 are undercut at the center portion to simplify machining and each roller is adjustably but freely rotatable on a spindle 35 held in the bushings 36 and 37.

According to the construction and operation of this printer, the scale of enlargement is varied by moving both brackets 21 and 22 along the post. However, direct connection is first made to the bracket 22 whereby it is moved as desired and then, due to the coupling or interconnection to the bracket 21, that is moved simultaneously but with a differential movement as governed by the automatic focusing means. In other words, movement of the lamp structure and negative carrier is always accompanied by a simultaneous movement of the lens, which movement is brought about by its interconnection to the automatic focusing mechanism, but at a differential rate as governed by that focusing means.

The weight of the movable structure is counterbalanced by an elongated, cylindrical weight 38 suspended within the tubular post 10. This weight is guided within the post by the rods 39 and 40 which also assist in the attachment of the strips 33 and 34. Weight 38 is channeled for sliding along rods 39 and 40. This weight connects by a flexible steel band 41 to the bracket 22, said band running over a pulley 42 which is supported at the upper end of the post and is freely rotatable upon a spindle bearing in lugs or projections 43 which are a part of the cap 44.

The weight 38 is bored out at its center and has a threaded section for engagement about the threaded shaft 45 by means of which the weight may be moved up or down within the post, thereby lowering or raising the bracket 22 and its attached and interconnected parts through the connection provided by the flexible band 41 as just described.

A second flexible band 41' connects to the lower end of weight 38, runs under a pulley 42', and attaches to the lower part of bracket 22. The double connection assures positive movement of the bracket in accordance with adjustments of the weight.

The shaft 45 is supported in suitable radial bearings at its lower end and is also maintained against axial movement by any suitable type of thrust bearing. It carries a bevel gear 46 which meshes with a second and similar gear 47 keyed to the end of a horizontal shaft 48 which extends toward the front of the projection board assembly, having a handwheel 49 fixed at that end. It is by means of this wheel, shafts and gearing, that the weight 38 and other movable elements are raised or lowered as above described.

The negative carrier has associated therewith extending brackets 50 and 51, these brackets supporting reels or spools 52 and 53 in the event pictures on roll film are to be enlarged. The cords 54 serve to rotate the reels or spools when changing from one exposure to another during the enlargement of those pictures on the roll of film. In the event cut film is to be handled, any of the usual types of negative holders may be employed, that being a feature not a part of this particular invention and therefore not described in detail here.

At each side of the hub surrounding post 10, and integral with bracket 22, is a projection 55, a part of the hub casting. Each of these carries a bushing 56 in which is free to rotate a shaft 57. That shaft has pinned thereon or otherwise fixed at one end an arm 58, and at the other end a similar arm 59. In effect, the arms and shaft constitute a two armed lever pivoted adjacent its center.

A cam plate 61 is rigidly attached at the back of the bracket 11 and that cam plate has two symmetrically disposed cam slots, a slot 62 at one side and 63 at the other. The arm 58 has a cam follower 64 which engages within the slot 62. This cam follower may take any of the well known forms but is preferably a ball bearing in which the cup or outer part of the bearing fits within slot 62, having therein a working clearance only. That provides rolling friction rather than sliding friction, prolonging the life of the slot and of the follower, as well as reducing to an absolute minimum the force required to effect vertical movements of the bracket 21 and attached parts, lens carrying bracket and the accompanying focusing of the same.

The arm 59 has a similar follower 65 which engages within cam slot 66 in wing cam plate 67. At the opposite side of the enlarger, arms, followers and cams are to be found which are identical with those just described except that they are reversely shaped and positioned.

As shown in Fig. 6, the wing cams are adjustable. The adjustment is effected by loosening the screws 68 and 69 whereupon the cam plate itself may be moved throughout a small angle. The plates attach to extensions 70 at the sides of bracket 21, but the attaching screws engage within oversized openings or slots in the plates. This adjustment is used when the mechanism is originally set up and is intended to compensate for inaccuracies in any of the interconnected parts, also for variations in focal length of the particular lens used, it being a well known fact that for all lenses there is always deviation to one side or the other of the theoretically correct figure.

The bracket 22 has been generally referred to as a bracket for supporting the lens assembly and by which the lens is moved to and from the projection board. This bracket is really made up of two adjustably connected pieces, the main bracket having an extension 71 which is so constructed as to be rigidly connected to the main part of the bracket but movable relatively thereto by a manual adjustment. Bracket 22 projects upwardly at 72 and is machined to provide a slot within which will slide a tongue projecting from the extension 71. A threaded shaft or spindle 73 is fixed against axial movement and may be turned by a knurled thumbwheel 74. This spindle engages the threaded portion of extension 71, and by turning the thumbwheel, focusing of the lens is effected.

Such an adjustment may be used in special cases, especially in the event a lens of different focal length is employed in place of the lens for which the automatic mechanism has been set. In that event the substitute lens may be of such different focal length that the adjustment of the wing cams does not suffice, or it might be that the cam adjustment is preferably to be left in a set position, in which event the manual focusing adjustment is employed. Extension 71 and bracket 22 are preferably provided with a cooperating scale 75 and a pointer 76 by means of which the setting of the parts can be returned to that previously existing when the original lens is again to be used.

*Operation*

The enlarger functions very much as is the common practice except that manual focusing is not necessary upon changing the scale of enlargement. That scale is changed by rotating handwheel 49 in the appropriate direction whereupon weight 38 will be raised or lowered, thereby effecting movement of the bracket 22 which carries the lamp, lens and accompanying parts. The bracket 21 supporting the lamp and negative holding assembly must move whenever the first mentioned bracket is raised or lowered, since there is a mechanical connection between the two. The wing cams and the interconnection of arms 59 would effect corresponding movement of bracket 21 in the event the position of followers 65 does not change along the slots 66. However, there is a change of position for these followers within these slots, that change being determined by the curvature of the slots which affect the arms 58 and, consequently, the oppositely directed arms 59. Thus, both the lens assembly and the negative holder move together either to or from the projection board, but at a differential rate as governed by the cam action of slots 62 and 63. These cam slots are of the usual functional curvature, but it is not necessary to use the steepest part of the curve, that is, that part of the curve at which the angularity changes most rapidly. Accordingly, the cam action both within slots 62 and 63 and within the wing cams functions at a very easy angle.

In the event the automatic focusing, when initially tested, does not appear to be synchronized exactly with the particular lens in the enlarger, the operator makes that adjustment necessary by means of the thumbwheel 74. The setting should be noted or marked so that proper adjustment can be effected whenever that particular lens is used. Once the correct position is determined, it is not necessary to resort to the auxiliary adjustment except upon changing lenses. Of course, the wing cams are also set to proper position for the particular lens.

If a lens of another calculated focal length different from that for which the mechanism has been originally designed is substituted, the automatic focusing may be dispensed with and the manual setting employed, in which event the enlarger is used just as any other of non-automatic type would be.

*Modification*

Now referring to Figs. 4 and 5, a modified form of the invention will be described, this form being applied to an enlarger in which the scale or ratio of enlargement is varied by movement of the projection board. This enlarger includes a base 77 from which there extends upwardly a tubular post 78. At the top of this post is fixed a bracket 79 carrying a lamp housing 80, the negative holder 81, and other elements incidental to illumination of the negative and for feeding film through the enlarger in the event roll film in longer lengths is to be handled. As in the enlarger previously described, the negative holder extends at each side carrying reels 82 and 83 for the roll film and cords 84 and 85 by means of which that film is advanced to enlarge the separate exposures thereon.

A second bracket 86 is movable along the post 78 and has rollers similar to the rollers 30 previously described which are engageable with bearing strips similar to the strips 33. Of course, it is only necessary to move this bracket 86 throughout a distance sufficient to effect focusing of the lens, whereas in the form of the invention previously described, the focusing movement was a part of a much more extended travel of the lens bracket, as the lamp and negative carrying mechanisms were moved for varying the scale.

Bracket 86 has an extension 87 which is adjustable with respect to the main part of the bracket, as previously described and as illustrated in Figure 2. A thumbwheel 88 is used for that auxiliary or manual focusing. The bracket carries a lens holder 89, a lens 90, a shutter, and a bellows 91 which extends upwardly to the base of the negative-carrying or holding structure.

A projection board 92 is adjustable on the framework 93 by means of the usual studs 94 and adjusting nuts threaded on them. The framework 93 is rigidly connected to a bracket casting 95 which has a plurality of rollers such as the rollers 30 engageable with strips attached at opposite sides of the post 78. This provides a rigidly guided connection of the projection board to the post but allows it to be moved vertically along that post so as to move it to and from the illuminating and projecting mechanism at the upper part of the enlarger.

A cam plate 96 is bolted to the back of bracket 95 and has the cam slots 97 and 98 which follow functional curves. This plate also has a rack 99 extending parallel to its center line, rigidly connected to the plate and having an attachment at its upper end for the flexible steel tape 100. This tape runs over a flanged pulley 101 carried on a spindle having bearings within lugs projecting from bracket 79. The tape then extends downwardly within post 78 to connect to a counterbalance weight 102. This counterbalance 102 is of substantially the same weight as the movable structure attached to bracket 95, so that only the inertia and a very slight amount of friction has to be overcome whenever it is desired to move the projection board for varying the scale of enlargement.

A collar 103 clamps to the post and has lugs 104 and 105 which serve to support pivots for bell crank levers 106 and 107. The collar also provides bearings for a spindle 108 which has fixed at either end handwheels 109 and 110. The spindle 108 also has a gear 111 keyed to it, that gear meshing with an idler 112 which in turn meshes with the rack. By means of either handwheel the rack is moved vertically, thereby effecting a movement of plate 96, to which the rack is connected, bracket 95 and the entire projection board assembly.

Each of the bell crank levers has an arm which is disposed substantially horizontally and which carries a follower 113 engageable within a cam slot 114 in a wing cam plate 115. Each of these plates is adjustably secured to the side of bracket 86. The other arm of each bell crank lever extends more or less in a vertical direction and carries a follower 116 engaged within the cam slot 97 or 98, as the case may be.

Operation

In general, this enlarger is operated in the same manner as described relative to that of the first part of this disclosure. The operator, by means of either handwheel 109 or 110, can raise the projection board or lower it, thereby varying the scale of enlargement. As the board is moved vertically, the attached cam plate 96 moves correspondingly and the bell crank levers governed by the master cam slots 97 and 98 are swung throughout an angle sufficient to move the bracket 86 throughout the proper distance for focusing the lens. The bell crank levers are interconnected with and move the lens-carrying bracket by means of the wing cam plates in which there are the cam slots 114 engaged by followers 113. Thus the focusing movement results from the action of two cam means each of which imparts some of the movement, but neither of which is unnecessarily steep nor designed to give a difficult or hard action. The curvature of the slots 97 and 98 is practically a straight line although it approaches that requisite functional curvature closely enough to give the desired focusing movement. It is preferable that slides 114 be cut straight and that all the curvature be applied to the cam slots in plate 96.

Adjustments may be effected by moving the cam plates 115 as described with respect to the plates 67 and by the manual adjustment of the extension 87.

The invention has been described in more or less specific terms and by reference to specific applications to the enlargers illustrated. The principles may be applied to any enlarger in which the scale of enlargement is to be varied and wherein a focusing of the lens is to be accomplished by moving the lens or the negative carrying plane with respect to the lens. The cams need not be formed as slots in a cam plate, but may be constructed in any other well known way, for example, the slots may be dispensed with and the followers caused to bear upon cam surfaces cut at the edge of the plates, the followers being maintained in an engagement with those surfaces by suitable springs. Likewise, the system of levers may be differently designed, and while it is preferable that the cams and levers be duplicated at either side to obtain a balanced structure, it will be sufficient in some instances if only one of these systems is employed rather than two. The latter applies especially to small enlargers where the weight is relatively low and the forces required to move the parts are accordingly small.

This description has reference to enlargers arranged vertically and in which the movement of the parts is mainly in a vertical direction. However, the same may be applied to horizontally designed enlargers, and in that event, the same principles may be availed of even though the other details and general construction are different.

The invention is defined in the appended claims.

I claim:

1. A projection printer having in combination, a lamp house, a negative holder, a lens and a projection board, independent supports, one for said lamp house and negative holder, one for the lens and one for the projection board, and a frame member along which at least two of the said supports are relatively movable for varying the scale of enlargement and for focusing the lens, cam means on at least one of said members having a cam surface for imparting part only of a movement necessary for focusing, a second cam means attached to another of said members and having a cam surface for imparting the remainder of that movement necessary to maintain the lens in focus as the scale of enlargement is varied, and interconnecting means between the first and second mentioned cam means and operable from the first and upon the second for imparting focusing movements in accordance with changes in scale of enlargement, and in such a manner that said movements are the sum of the motion imparted by each cam.

2. A projection printer having in combination a post, a projection board and a support for said board by means of which it is fixedly attached to the post, a lamp and negative carrying assembly and a bracket by means of which they are moved along said post, a lens and a bracket for said lens by means of which it may be moved along the post for focusing, said means including cam means attached to said lamp and negative carrying bracket and having a cam surface for imparting part only of a movement necessary for focusing, a second cam means attached to said support for said projection board and having a cam surface for imparting the remainder of that movement necessary to maintain the lens in focus as the scale of enlargement is varied, and a pivoted, two-armed lever carried by the lens supporting bracket and having a follower at either arm, one of which engages the first-mentioned cam surface and the other of which engages the second-mentioned cam surface so that as movements are imparted to the lamp and negative carrying bracket, the said cams and levers will impart movements to the lens carrying bracket for maintaining the lens in properly focused relation to the said lamp and negative carrier assembly and to the projection board.

3. A projection printer having in combination a post, a projection board and a connecting bracket by means of which said projection board is fixedly attached to the post, a bracket movable along the post and supporting a lamp and negative carrying assembly, a second movable bracket to which is attached a lens, shutter and a bellows, said bellows also being attached at the base of the negative carrier, pivots at either side of said lens carrying bracket, a lever arm extending upwardly from each pivot and another lever arm extending downwardly therefrom, each pair of arms at a pivot being connected for simultaneous movement, wing cams projecting from the lamp and negative carrying means and having therein cam slots each of which is adapted to impart a portion only of a focusing movement, said slots being engageable by cam followers at the ends of the upwardly extending lever arms, a master cam plate having curved cam slots therein each of which is adapted to impart the remainder of the focusing movement, said curved slots being fixed to the projection board support, the downwardly extending arms having followers at their ends adjacent the said cam plate and engageable within cam slots therein whereby movements of the lamp and negative carrier are accompanied by movements of the lens carrier as the scale of enlargement is varied.

4. A projection printer having in combination a post, a projection board and a bracket for connecting said board to the post and by means of which it may be moved along the length of that post, a bracket at the top of said post, and a lamp and negative carrying assembly supported thereby, another bracket movable along the post and having a lens and shutter assembly associated therewith, cam means including a cam slot adapted to impart a part only of a focusing movement, said cam means being connected to the lens carrying bracket, a master cam having a functionally curved slot adapted to impart the remainder of the focusing movement and supported by the projection board carrying bracket, a collar fixed to the post, a rack by means of which the projection board may be moved for varying the scale of enlargement, and a handwheel and gearing meshing with said rack and carried by the collar, a lever pivoted on a part of said collar and having one arm provided with a follower engageable with the cam slot in said master cam and another and angularly disposed arm having a follower engageable within the slot in that cam means associated with the lens carrying bracket, whereby as the scale of enlargement is varied by moving the projection board along the post, focusing movements are simultaneously imparted to the lens.

5. A projection printer having in combination, a negative holder, a lens and a projection board, means for supporting said holder, lens and board in such a manner that the lens and one of the other said members are movable to and from the third member for varying the scale of enlargement and for focusing the lens, one cam means having a cam surface for imparting a portion only of that movement necessary for focusing, said cam means being relatively fixed with respect to the movable members, and a second cam means having a cam surface for imparting the remainder of that movement necessary to maintain focus as the scale of enlargement is varied, said second cam means being movable with one of the movable members, and interconnecting, motion transmitting means including cam followers so disposed as to receive motion from one of said cams and to impart that motion through the said means and through the other said cam thereby to move the support for the lens and maintain it in focus.

6. A projection printer having in combination, a negative holder, a lens and a projection board, a support for independently mounting each, the support for the lens and one of the other members being movable so that the negative carrier and lens and the projection board may be moved relatively to and from each other to vary the scale of enlargement, and the lens to and from the negative carrier to focus the image projected by it on the projection board, one cam means having a cam surface for imparting a portion only of a movement necessary for focusing, said means being carried by the support for the projection board and another cam means having a cam surface for imparting the remainder of that movement necessary to maintain the lens in focus as the scale of enlargement is varied, said means being carried by the support for the lens, and a two armed lever having a follower at either arm, one engageable with the cam carried by the support for the projection board and the other engageable with the cam carried by the support for the lens, the construction being such that focusing movements imparted are the sum of the effect of both cams on the said lever.

7. A projection printer having in combination, a lamp house, a negative holder, a lens and a projection board, supports, one for said lamp house and negative holder, one for the lens and one for the projection board, and a frame member along which at least two of the said supports are relatively movable for varying the scale of enlargement and for focusing the lens, cam means attached to one of said members having a cam surface for imparting part only of a movement necessary for focusing, a second cam means attached to another of said members and having a cam surface for imparting the remainder of that movement necessary to maintain the lens in focus as the scale of enlargement is varied, and a pivoted, two-armed lever having a follower at either arm, one of which engages the first mentioned cam surface and the other of which engages the second mentioned cam surface so that as relative movements are imparted to the first cam, the effect of that cam on the lever is transmitted through the second cam to focus the lens.

8. A projection printer having in combination a post, a projection board and a support for said board by means of which it may be moved along the post, a lamp and negative carrying assembly and a supporting bracket therefor adjacent the upper end of the post, a lens and a lens carrying bracket by means of which said lens may be moved to and from the negative carrying plane and along the post, cam means attached for movement with the lens carrying bracket and having a cam surface so shaped as to impart a portion only of the movement necessary to maintain said lens in focus as the scale of enlargement is changed, a second cam means attached for movement with the projection board support and having a cam surface so shaped as to impart the remaining portion of that movement necessary to focus the lens, and a two-armed lever pivoted to an element fixed to the post and having followers, one on one of said lever arms engageable with the first cam surface and one on the other arm engageable with the other cam surface, the construction of and interengagement between the lever arms and the cam means being such that focusing movements are imparted to the lens as the projection board is moved for changing the scale of enlargement which movements are the sum of the effects of each individual cam.

9. A projection printer having in combination a post, a projection board fixedly carried by said post, a lamp and negative carrying assembly carried by and movable along the post, a lens and separate supporting means therefor movable along the post, and means for maintaining the focus of said lens at the plane of the projection board as the movable lamp, negative carrier and lens are moved to and from the projection board for varying the scale of enlargement, said means including cam means attached to said lamp and negative carrying assembly and having a cam surface for imparting part only of a movement necessary for focusing, a second cam means forming an extension of said projection board and having a cam surface for imparting the remainder of that movement necessary to maintain the lens in focus as the scale of enlargement is varied, and a pivoted, two-armed lever carried by the lens supporting means and having a follower at either arm, one of which engages the first-mentioned cam surface and the other of which engages the second-mentioned cam surface so that as movements are imparted to the lamp and negative carrying assembly, the said cams and levers will impart movements to the lens carrying means for maintaining it in properly focused relation to the said lamp and negative carrying assembly and the projection board.

10. Focusing mechanism for an automatic focusing projection printer of the type which has a lens to be maintained in focus, including in combination a cam means having a cam surface of such contour as to impart a portion only of a total movement necessary for focusing, a second cam means having a cam surface of such contour as to impart the remainder of that focusing movement, and a two-armed lever having followers, one at each arm, for engagement with the cam surfaces of the cam means, said cam means being provided for attachment to parts of the printer and said lever having means by which it may be pivoted to a part of the printer.

CARL H. JACOBSON.

REFERENCES CITED

The following references are of record in the file of this patent:

UNITED STATES PATENTS

| Number | Name | Date |
|---|---|---|
| 1,488,846 | Thomas | Apr. 1, 1924 |
| 1,460,714 | Fritts | July 3, 1923 |
| 1,325,154 | Hopkins | Dec. 16, 1919 |